United States Patent Office 3,443,423
Patented May 13, 1969

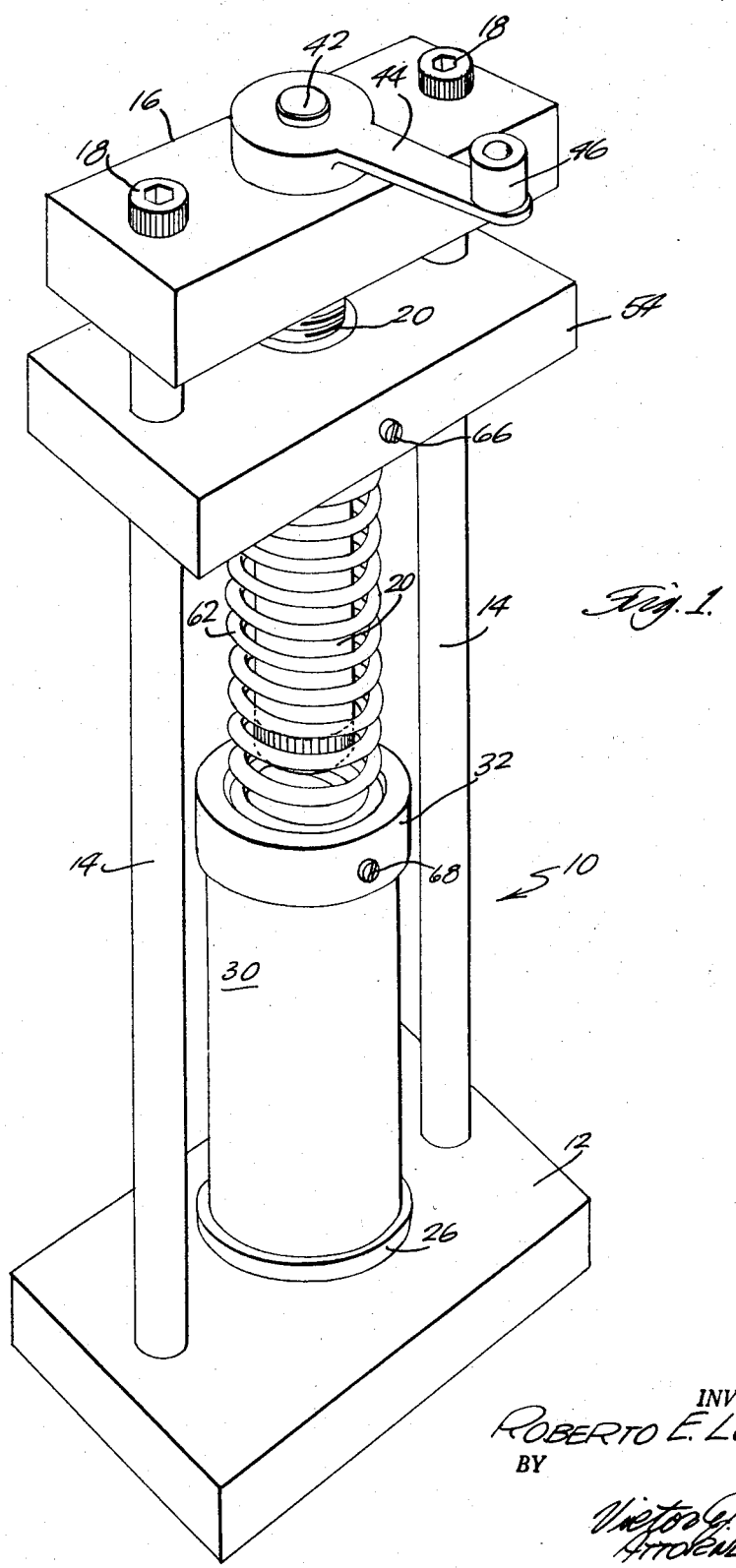

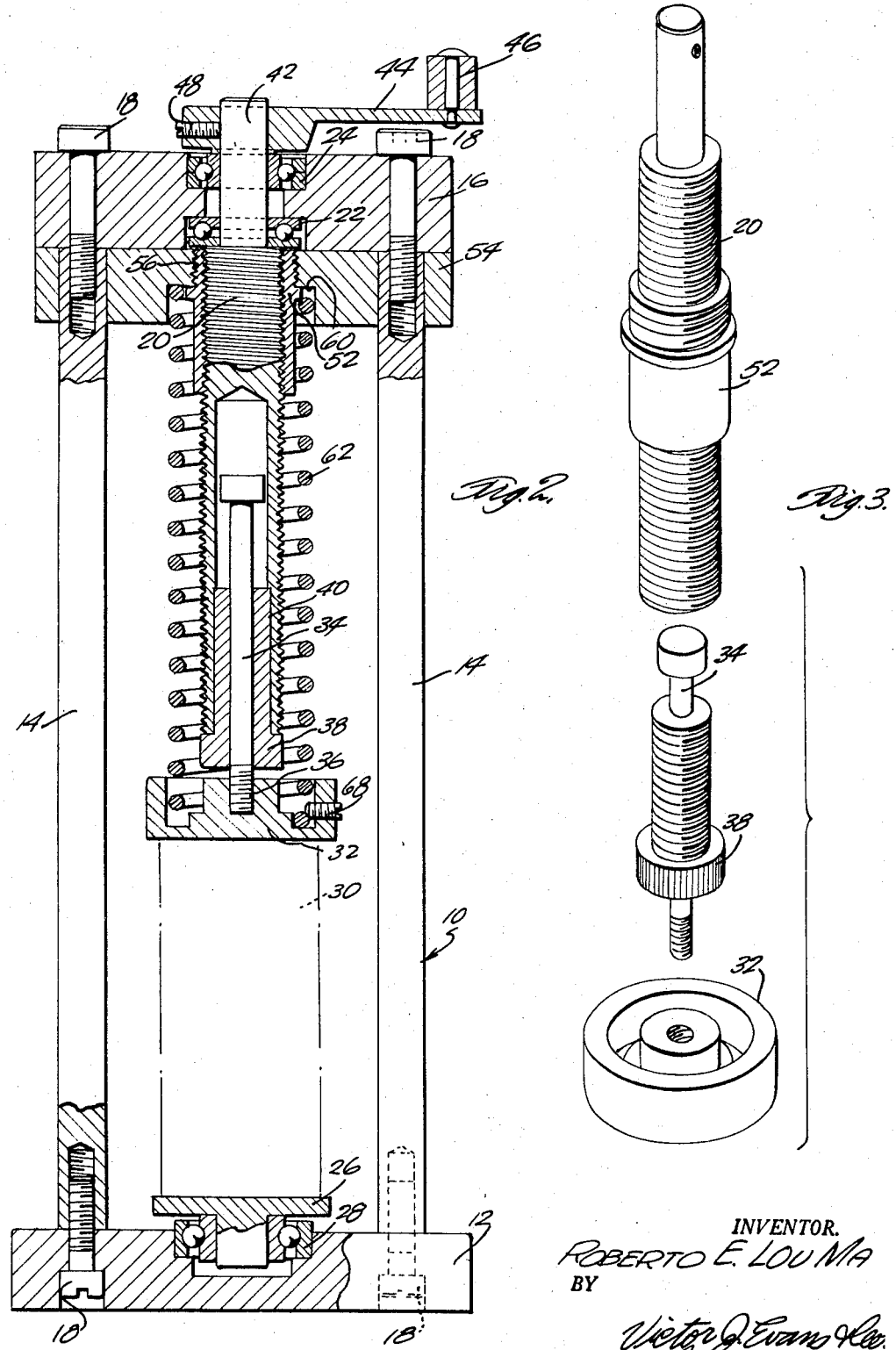

3,443,423
APPARATUS FOR TESTING THE COMPRESSIVE STRENGTH OF SOIL SPECIMENS
Roberto Edgar Lou Ma, 15C., 11—28 Zona 10, Guatemala, City, Guatemala
Filed Mar. 14, 1966, Ser. No. 535,652
Int. Cl. G01n 3/08
U.S. Cl. 73—84     2 Claims

ABSTRACT OF THE DISCLOSURE

Apparatus for testing compressive strengths of materials by inducing structural failure to a cylindrical soil specimen through an application of a gradually increasing compressive axial load, and at the same time measuring the corresponding axial deformation caused to said specimen at successive intervals of increasing load.

---

The present invention relates to new and improved apparatus for testing the compressive strength of soil or other like specimens, and more particularly relates to apparatus useful in soil mechanics and foundation engineering works.

The testing load is provided by a simple screw jack, through a calibrated helical compression spring. The loading screw is rotated by means of a hand crank to force the yoke downwards, loading the soil specimen placed between the platens through the calibrated spring. The spring compresses proportionally to the load applied according to Hook's law, which causes a vertical shortening of the distance between the yoke and the traveling platen, equal to the amount the spring compresses. The traveling platen is mounted to the lower end of the loading screw, and guided axially by means of a guide bushing and a guide stem. The guide bushing rotates integrally with the loading screw, but the platen and stem are impeded of rotation by the loading spring, to which the platen is attached with a setscrew. This relative rotation between guide stem and bushing renders the transmission of the load from the spring to the specimen smooth and frictionless, whereupon the load applied on the specimen corresponds truly with the load on the calibrated spring. In other words, the deflection of the calibrated spring amounts exactly for the load applied on the specimen. This is the main feature of the apparatus. The deflection of the spring, which is equal to the relative movement between the traveling platen and the yoke, can be measured with any means such as a scale, dial deflection indicators, autographic devices, etc. Knowing the deflection of the spring, the load on the specimen can also be known at any given moment. Upon compression, the calibrated spring has a slight tendency to twist. This torsion is absorbed by the stationary platen ball bearing, and not by the specimen.

The invention therefore relates generally to an apparatus for testing the compressive strength of materials, especially sub-surface soils, and to an apparatus for testing the compressive stress-strain characteristics of cohesive soils, by inducing structural failure to a cylindrical soil specimen through the application of a gradually increasing compressive axial load, and at the same time measuring the corresponding axial deformation caused to said specimen, at successive intervals of the increasing load. Load on specimen and deformation are more conveniently expressed in terms of unit stress and unit strain respectively, which are computed as follows:

Unit strain (percent) —
$$\frac{\text{Specimen Strain (in.)}}{\text{Initial Height of Specimen (in.)}} \times 100$$

Unit stress (lbs./sq. in.) —
$$\frac{\text{Load on specimen (lbs.)} \times (1-\text{Unit strain})}{\text{Initial cross-sectional area of specimen (sq. in.)}}$$

By plotting on a graph corresponding unit strains against successive intervals of the gradually increasing unit stress, a curve representing the stress-strain characteristics of the soil under test can be obtained. Soil compressive strength is defined as the maximum unit stress that can be induced in the specimen.

The apparatus has a lower stationary platen and an upper traveling platen, between which the cylindrical specimen is compressed. The testing load is provided by a helical compression spring, calibrated, whose deflection is the indication of the magnitude of the testing load being applied at any given moment. At the same time, the apparatus is also operative to indicate the consequent specimen deformations. The most important feature of the apparatus is that great accuracy in the determination of load is achieved through a novel frictionless device comprising the traveling platen guide and mount, as hereinafter explained.

A further object of the present invention provides the use of a calibrated spring which will operate independently of the guide stem and platen and by reason of the fact that the guide bushing rotates integrally with the loading screw, that the stem and platen will be impeded of rotation whereby the transmission of the load to the specimen will produce a true compression reading for the particular soil specimen concerned insofar as compressibility is provided by the displacement of the yoke in compression of the spring. This displacement is a measure of the soil which is being tested.

The above and other objects and advantages of the invention will become apparent upon full consideration of the following detailed description and accompanying drawings, in which:

FIGURE 1 is a generally perspective view of the apparatus of the present invention showing the manner in which the soil is tested, and FIGURE 2 is a vertical section taken along a central axis thereof, and FIGURE 3 is a generally perspective expanded or blown up view of the internal components of the loading mechanism.

Referring now to the drawings, there is shown a testing apparatus 10 for testing the compressive strength of materials, such as sub-surface soils, in which there is a base 12 provided with a pair of upstanding tie rods 14, 14 and which terminate in a head member 16. The base and the head member are retained onto the tie rods 14, 14 by a series of bolts 18, 18, 18, as shown. Centrally disposed within the head member 16 there is a loading screw 20 which is disposed in the counterbored center of the head member 16 so that the bottom counterbore retains a thrust ball bearing 22 and the top counterbore is adapted to retain a radial ball bearing 24.

From a central or axial location in the base 12, there is mounted a stationary platen 26 which is attached and mounted from the base by means of a ball bearing arrangement 28. Upon the stationary platen 26 there is the soil speciment 30 sought to be tested and examined by the apparatus of the invention. The soil specimen is of cylindrical configuration and is placed between the stationary platen 26 and the traveling platen 32 which is mounted from a guide stem 34 that threadedly engages the traveling platen 32 by threads 36, and by a guide bushing 38 which is attached to the lower end of the loading screw 20 and rotates integrally therewith. The loading screw is a lefthand tapped element that is hollowed from the bottom by a threaded bore to receive the guide bushing 38, and makes contact therewith at surface 40 which is threaded therebetween. The upper end of the loading screw is machined to form a shank 42 on which may be positioned a hand crank 44 with a handle 46 and with a collar that is provided with a set screw 48 for maintaining the hand crank securely affixed to the shank 42. On the loading screw 20 there is provided a loading nut 52 which is driven by the loading screw and is attached to a yoke 54 by thread means 56. The yoke 54 has a centered vertical threaded opening that engages with the threaded means 56 and into which the loading nut 52 is fitted, and through which the lateral vertical holes are provided to allow the tie rods passage. The yoke has a cylindrical depression 60 at the bottom to accommodate the upper end of the calibrated spring 62.

The loading spring 62 is a helical compression type spring and is calibrated in pounds per inch of deflection, and a scale may be provided by any known means including the provision of a scale along either one of the tie rods 14. The helical spring is fixed by means of set screws to the yoke 54, such as set screw 66, and by a set screw 68 in the traveling platen at the lower end of the helical spring. As has been described above, the guide stem 34 slides inside the guide bushing 40 and the guide stem is threadedly engaged or attached to the traveling platen 32. The traveling platen is assembled integrally with the guide stem and has an annular depression at the top thereof into which the lower end of the calibrated helical spring is disposed to rest.

In operation of the apparatus of the invention, the cylindrical soil specimen 30 is placed between the platens 26 and 32, and the loading screw is rotated by turning the hand crank 44 in a clockwise direction. Rotation of the loading screw drives the yoke 54 downwardly, compressing the calibrated spring 62 which gradually loads the soil specimen through the traveling platen 32. Said platen is mounted at the lower end of the loading screw 20 by means of the guide stem 34 and the guide bushing 38. The calibrated spring deflects proportionally to the magnitude of the load applied. It is basic that the application of stress to any material will cause a corresponding strain according to Hook's law. Hence, upon loading, the soil specimen compresses, causing the traveling platen 32 to move downwardly. In its downward movement, the traveling platen is guided axially by its guide stem 34 sliding inside the guide bushing 38. The guide bushing rotates integrally with the loading screw, but the guide stem and traveling platen are impeded of rotation by the calibrated spring, to which the platen is affixed by means of the set screw 68.

This relative rotation between guide stem and bushing eliminates axial friction from the movement of the platen, whereupon the transmission of the testing load from the calibrated spring to the specimen is rendered smooth and frictionless, and, consequently, the deflection of the calibrated spring corresponds exactly to the load applied to the specimen. Upon knowing the amount the calibrated spring deflects at any given moment, the magnitude of the load being applied to the specimen at that moment is determinable. The deflection of the calibrated spring, which, as mentioned is indicative of the magnitude of the load applied, is equal to the relative displacement between the yoke and the traveling platen, and the strain of the specimen is equal to the relative displacement between the upper and lower platens 26, 32. These relative displacements are to be measured by indicators of any known kind, such as a graduated scale, micrometers, dial gauges, autographic recording devices, etc., which may be permanently mounted on the apparatus. In this manner, readings of the compressive axial loads and the corresponding axial strain can be taken at any given moment. Upon compression, the calibrated spring has a slight tendency to twist. This torsion is to be absorbed by the stationary platen ball bearing, and not by the specimen.

The test is carried on by increasing the load until structural failure of the soil specimen is obtained, upon which load is removed by reversing the rotation of hand crank 44.

What is claimed is:
1. An apparatus for testing the compressive strength of soil specimens of cylindrical configuration comprising a base, a head member, a pair of tie rods for supporting the head vertically over said base, a stationary platen mounted between said rods on said base by a ball bearing and on which is mounted said soil specimen, a loading screw mounted from said head member for mating with a loading nut and rotatably disposed in the center of said head member and in axial alignment with said stationary platen, a hand crank for turning said loading screw, a traveling platen disposed by coaxial means from said loading screw, a yoke that telescopically is displaced along said tie rods by threadedly engaging said loading screw and said loading nut, and a helical calibrated spring disposed between said yoke and said traveling platen coaxially for applying loads to said soil specimen as the yoke is displaced toward said base, said coaxial means being a guide bushing rotating integrally with said loading screw, a guide stem having one end thereof being slidable in said guide bushing, and said coaxial hollow portion within said loading screw, and in which said guide stem is threadedly disposed within the coaxial portion of said traveling platen.

2. The invention according to claim 1 wherein set screws are disposed for retaining said helical calibrated spring within depressions at the top of the traveling platen and at the bottom of the yoke to accommodate the upper and lower end of the calibrated spring, respectively.

References Cited
UNITED STATES PATENTS

| 2,041,869 | 5/1936 | Smith et al. | 73—94 |
| 2,414,550 | 1/1947 | Patch | 73—94 |
| 2,907,203 | 10/1959 | Langmead | 73—94 |

CHARLES A. RUEHL, *Primary Examiner.*

U.S. Cl. X.R.

73—94